United States Patent
Kanazawa et al.

(10) Patent No.: US 11,233,252 B2
(45) Date of Patent: Jan. 25, 2022

(54) FUEL CELL CASE

(71) Applicant: TOYOTA JIDOSHA KABUSHIKI KAISHA, Toyota (JP)

(72) Inventors: Hideyuki Kanazawa, Toyota (JP); Michitaro Itoga, Okazaki (JP); Hitoshi Hamada, Gotenba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 98 days.

(21) Appl. No.: 16/661,231

(22) Filed: Oct. 23, 2019

(65) Prior Publication Data

US 2020/0168923 A1 May 28, 2020

(30) Foreign Application Priority Data

Nov. 28, 2018 (JP) .............................. JP2018-222134

(51) Int. Cl.
  *H01M 8/04082* (2016.01)
  *B60L 50/72* (2019.01)
  *H01M 50/147* (2021.01)
  *H01M 50/543* (2021.01)

(52) U.S. Cl.
  CPC ......... *H01M 8/04082* (2013.01); *B60L 50/72* (2019.02); *H01M 50/147* (2021.01); *H01M 50/543* (2021.01)

(58) Field of Classification Search
  CPC ... B60L 50/72; H01M 50/147; H01M 50/543; H01M 8/04082; H01M 8/2475; Y02T 90/16; Y02T 90/40
  See application file for complete search history.

(56) References Cited

U.S. PATENT DOCUMENTS

| | | | |
|---|---|---|---|
| 2002/0187380 A1* | 12/2002 | Tanaka | H01M 8/04559 429/425 |
| 2007/0259254 A1* | 11/2007 | Tanaka | H01M 8/2475 429/53 |
| 2015/0079426 A1* | 3/2015 | Chen | H01M 50/20 429/53 |

FOREIGN PATENT DOCUMENTS

JP      2006-140163      6/2006

\* cited by examiner

*Primary Examiner* — Adam A Arciero
(74) *Attorney, Agent, or Firm* — Finnegan, Henderson, Farabow, Garrett & Dunner, LLP

(57) ABSTRACT

A fuel cell case includes: a casing portion provided with a through hole that communicates between an internal space for accommodating a fuel cell stack and outside of the casing portion; a lid portion attached to an outer surface of the casing portion by a first connection portion so as to close the through hole; and a cover portion arranged on the lid portion and attached to the outer surface of the casing portion. It is configured that at least one of the lid portion and the first connection portion is fractured when an internal pressure of the casing portion is increased to be equal to or higher than a predetermined pressure and that the cover portion remains to be attached to the casing portion even after at least one of the lid portion and the first connection portion is fractured.

6 Claims, 8 Drawing Sheets

FUEL CELL CASE

INCORPORATION BY REFERENCE

The disclosure of Japanese Patent Application No. 2018-222134 filed on Nov. 28, 2018 including the specification, drawings and abstract is incorporated herein by reference in its entirety.

BACKGROUND

1. Technical Field

The disclosure relates to a fuel cell case.

2. Description of Related Art

In regard to a fuel cell, a fuel cell stack is generally accommodated in a case having relatively high sealability. When a rapid pressure increase occurs in such a fuel cell case, such a problem possibly occurs that the case is fractured and that the case scatters at the time of the fracture. Thus, for example, in Japanese Patent Application Publication No. 2006-140163 (JP 2006-140163 A), a configuration in which a pressure release hole is provided in the case and is sealed by a lid member is proposed. In such a configuration, when the pressure in the case is increased, the above lid member is detached from the case to release the pressure in the case. In this way, the fracture of the entire case is prevented.

SUMMARY

However, in the case where the pressure release hole is sealed by the lid member as described above, the detached lid member possibly flies in an unintended direction at the time of the pressure increase in the case.

The disclosure can be realized in the following aspects.

According to an aspect of the disclosure, a fuel cell case is provided. This fuel cell case includes: a casing portion in which a space for accommodating a fuel cell stack is formed, the casing portion having a through hole that communicates between the space and outside of the casing portion; a lid portion that is attached to an outer surface of the casing portion by a first connection portion and is configured to close the through hole; and a cover portion that is arranged on the lid portion and is attached to the outer surface of the casing portion. At least one of the lid portion and the first connection portion is configured to be fractured when an internal pressure of the casing portion is increased to be equal to or higher than a predetermined pressure. The cover portion is configured to be attached to the casing portion even after the internal pressure of the casing portion is increased to be equal to or higher than the predetermined pressure, and at least one of the lid portion and the first connection portion is fractured.

According to the fuel cell case in this aspect, the cover portion is attached to the casing portion. Thus, even when the internal pressure of the casing portion is increased to be equal to or higher than the predetermined pressure, and at least one of the lid portion and the first connection portion is fractured, it is possible to prevent scattering of the lid portion in an unintended direction.

In the fuel cell case of the above aspect, the cover portion may be attached to the casing portion by a second connection portion that differs from the first connection portion.

According to the fuel cell case of this aspect, it is easy to set connection strength of each of the first connection portion and the second connection portion to desired strength. As a result, it is possible to easily achieve such a configuration that, for example, when the internal pressure of the casing portion is increased to be equal to or higher than the predetermined pressure, the first connection portion is fractured, but the second connection portion remains to be connected.

In the fuel cell case of the above aspect, the cover portion may include a high-rigid portion, and the high-rigid portion may be configured to have higher rigidity than a portion other than the high-rigid portion in the cover portion.

According to the fuel cell case of this aspect, a portion where the lid portion or a piece of the lid portion is likely to be scattered from a clearance between the cover portion and the casing portion can be set in advance according to a position where the high-rigid portion is provided.

In the fuel cell case of the above aspect, the lid portion may be a resin sheet, and the first connection portion may be an adhesive layer.

According to the fuel cell case of this aspect, the lid portion can easily be fractured at the time of the pressure increase in the casing portion. In addition, it is possible to further prevent damage to a part, equipment, or the like arranged around the fuel cell caused by the piece of the lid portion. In addition, the lid portion can further easily be connected to the casing portion while a sealing property between the lid portion and the casing portion is sufficiently secured.

In the fuel cell case of the above aspect, the cover portion may be arranged in such a manner as to contact the lid portion without applying a pressure to the lid portion.

The cover portion may be arranged separately from the lid portion, and a distance between the cover portion and the outer surface of the casing portion may be equal to or shorter than 5 mm.

The disclosure can be realized in various aspects. For example, the disclosure can be realized in aspects of a fuel cell having the fuel cell case, a manufacturing method of the fuel cell case, a pressure-releasing method of the fuel cell case, a vehicle on which the fuel cell is mounted, and the like.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
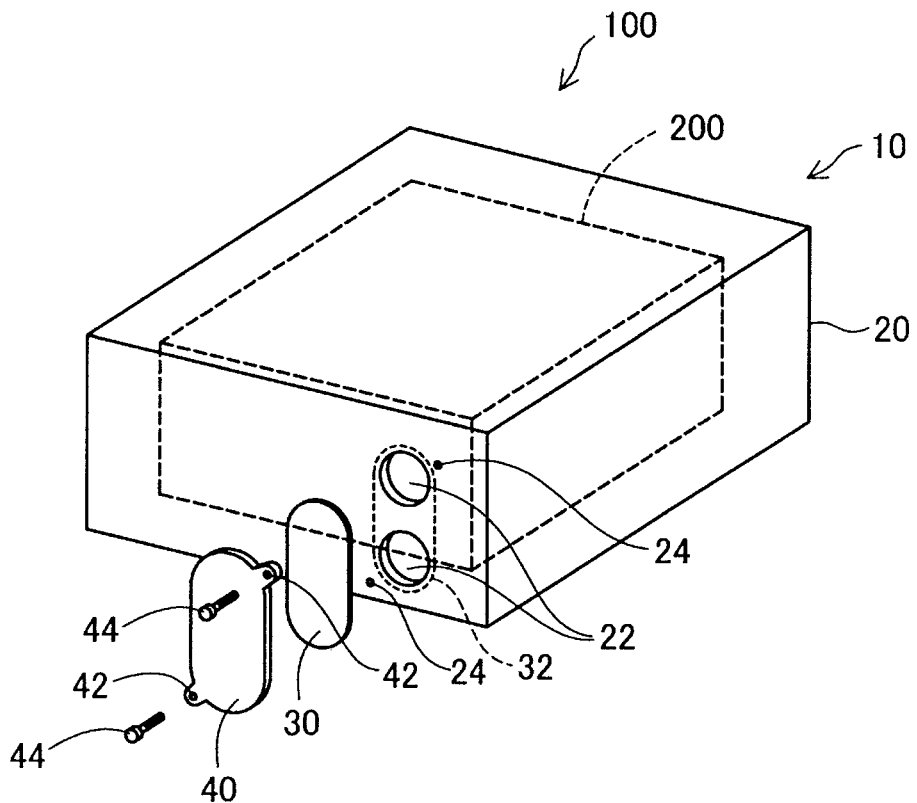
FIG. 1 is a perspective view of a schematic configuration of a fuel cell.
Figure 2:
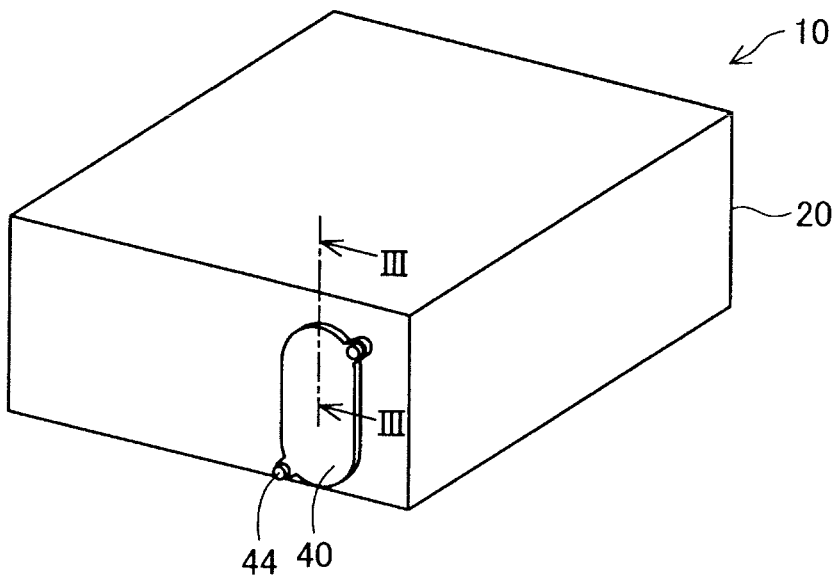
FIG. 2 is a perspective view of the schematic configuration of the fuel cell.

FIG. 1 and FIG. 2 are perspective views of a schematic configuration of a fuel cell 100 as a first embodiment of the disclosure. The fuel cell 100 includes a fuel cell stack 200 and a fuel cell case 10. The fuel cell 100 in this embodiment can be mounted on a movable object such as a vehicle and can be used as a drive power supply for the vehicle or the like, for example. Alternatively, the fuel cell 100 may be used for a different application such as use thereof as a stationary power supply.

The fuel cell stack 200 is a stacked body in which plural single cells are stacked. For example, the fuel cell stack 200 can be a solid polymer fuel cell. However, the fuel cell stack 200 may be another type of the fuel cell. The fuel cell stack 200 is accommodated in the fuel cell case 10. In FIG. 1, the fuel cell stack 200, which is accommodated in the fuel cell case 10, is indicated by broken lines.

The fuel cell case 10 includes a casing portion 20, a lid portion 30, and a cover portion 40. The lid portion 30 and the cover portion 40 are attached to an outer surface of the casing portion 20. FIG. 1 illustrates a situation before the lid portion 30 and the cover portion 40 are attached, and FIG. 2 illustrates a situation after the lid portion 30 and the cover portion 40 are attached. The lid portion 30 is attached to the casing portion 20 by a first connection portion 32. The cover portion 40 is attached to the casing portion 20 by a second connection portion 44.

The casing portion 20 has a hollow box shape in which a space for accommodating the fuel cell stack 200 is formed. In this embodiment, the casing portion 20 has a substantially rectangular parallelepiped shape. The casing portion 20 is formed with a through hole 22 that communicates between the above space for accommodating the fuel cell stack 200 and the outside of the casing portion 20. In this embodiment, the through hole 22 is formed as a hole, a cross section of which in a direction along the outer surface of the casing portion 20 has a substantially circular shape. FIG. 1 illustrates the situation where the two through holes 22 are formed in the casing portion 20. However, the number of the through hole 22 can be any number that is equal to or larger than one. For example, the casing portion 20 can be a cast product that is made of metal (for example, aluminum or an aluminum alloy).

The lid portion 30 is attached to the casing portion 20 in such a manner as to close the through hole 22. The lid portion 30 in this embodiment is formed in a rectangular shape with rounded corners. The two through holes 22 are closed by the single lid portion 30. The lid portion 30 is a member that releases a pressure in the casing portion 20 by a fracture of the lid portion 30 or the first connection portion 32 in the case where a rapid pressure increase occurs in the casing portion 20, such as a case where hydrogen leaks out of the fuel cell stack 200 in the casing portion 20 and is ignited. The first connection portion 32 has a sealing property that prevents entry of liquid water into the fuel cell case 10 through the through hole 22.

Figure 3:
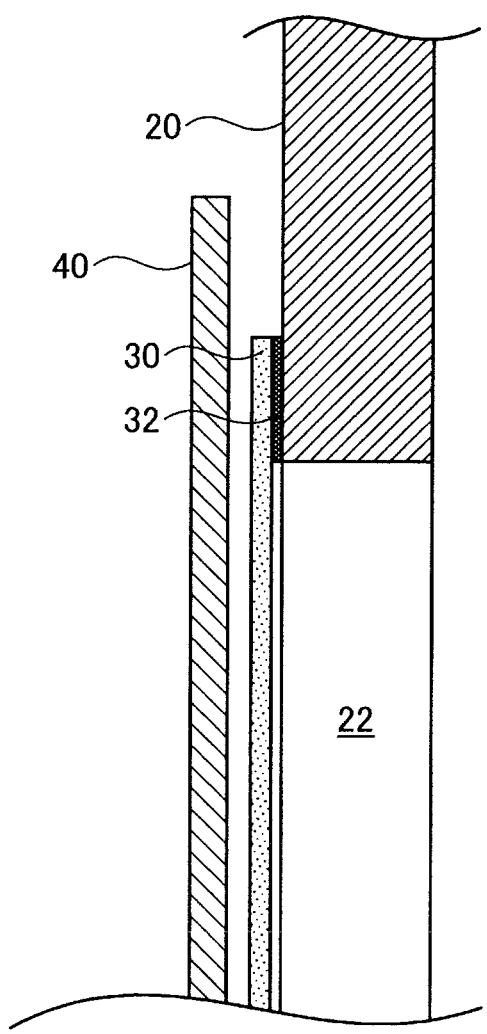
FIG. 3 is a cross-sectional view that illustrates cross section III-III in FIG. 2.

FIG. 3 is a cross-sectional view that illustrates cross section III-III in FIG. 2. The first connection portion 32 in this embodiment is constructed of an adhesive layer including an adhesive. As the adhesive, for example, an acrylic adhesive, a silicone adhesive, an epoxy adhesive, or the like can be used. The lid portion 30 can be formed of a resin sheet including a resin. Examples of the resin are a thermoplastic resin such as polyvinyl chloride, polypropylene, polyethylene, or polyamide and a thermosetting resin such as an epoxy resin or a phenolic resin. From a perspective of securing handleability of the resin sheet, for example, a thickness of the resin sheet is preferably equal to or greater than 50 µm, more preferably equal to or greater than 100 µm, and further more preferably equal to or greater than 200 µm. In addition, from a perspective of facilitating pressure release from the casing portion 20 caused by the fracture of the lid portion 30, the thickness of the resin sheet is preferably equal to or less than 1 mm, more preferably equal to or less than 700 µm, and further more preferably equal to or less than 500 µm. Alternatively, the lid portion 30 may be formed of a plate-shaped member made of the resin or the metal. In addition, the lid portion 30 may be formed by using a resin with hydrogen permeability such that hydrogen can be discharged from the casing portion 20 via the lid portion 30 in the case where hydrogen leaks out of the fuel cell stack 200.

In this embodiment, at least one of the lid portion 30 and the first connection portion 32 is fractured and releases the pressure in the casing portion 20 when the internal pressure of the casing portion 20 is increased to be equal to or higher than a predetermined pressure. The predetermined pressure is defined as a pressure in the casing portion 20 in the case where hydrogen leaks out of the casing portion 20 and is ignited. Such a pressure can be examined and set experimentally in advance, for example. Note that, "at least one of the lid portion 30 and the first connection portion 32" means only the lid portion 30, or only the first connection portion 32, or both of the lid portion 30 and the first connection portion 32.

In order to cause the fracture of the lid portion 30 at the time when the internal pressure of the casing portion 20 is increased to be equal to or higher than the predetermined pressure, strength of the lid portion 30 is preferably set on the basis of the predetermined pressure described above and an opening area of the through hole 22 such that the lid portion 30 is fractured during the pressure increase in the casing portion 20. That is, an upper limit value of the strength of the lid portion 30 is preferably set as a maximum value of the strength of the lid portion 30 at the time when the lid portion 30 is fractured in the case where the first connection portion 32 has connection strength that is sufficient enough to prevent a fracture thereof during the above pressure increase. The strength of the lid portion 30 can be adjusted by a material and the thickness of the lid portion 30, for example. For example, in the case where the strength of the lid portion 30 is less than the connection strength of the first connection portion 32 as in the case where the lid portion 30 is constructed of the resin sheet, the lid portion 30 is fractured, and the pressure in the casing portion 20 is released when the rapid pressure increase occurs in the casing portion 20.

In order to cause the fracture of the first connection portion 32 at the time when the internal pressure of the casing portion 20 is increased to be equal to or higher than the predetermined pressure, the connection strength of the first connection portion 32 is preferably set on the basis of the predetermined pressure described above and the opening area of the through hole 22 such that the first connection portion 32 is fractured during the pressure increase in the casing portion 20. That is, an upper limit value of the connection strength of the first connection portion 32 is preferably set as a maximum value of the connection strength of the first connection portion 32 at the time when the first connection portion 32 is fractured in the case where the lid portion 30 has the strength that is sufficient enough to prevent the fracture thereof during the above pressure increase. For example, the connection strength of the first connection portion 32 can be set by appropriately selecting the type of the adhesive constituting the first connection portion 32.

The cover portion 40 is arranged on the lid portion 30 and is attached to the casing portion 20. The cover portion 40 in this embodiment is formed in a rectangular shape with rounded corners that is one size larger than the lid portion 30, and is arranged on the lid portion 30 in such a manner as to overlap the entire lid portion 30. For example, the cover portion 40 can be constructed of a plate-shaped member made of the metal.

In this embodiment, the second connection portion 44 that attaches the cover portion 40 to the casing portion 20 is constructed of a screw. That is, in this embodiment, as illustrated in FIG. 1 and FIG. 2, the cover portion 40 is attached to the casing portion 20 by screwing. In the cover portion 40, two fastening holes 42, each of which penetrates the cover portion 40, are formed at diagonal positions. On the outer surface of the casing portion 20, two screw holes 24 are provided at positions that respectively correspond to the fastening holes 42. Then, the screws as the second connection portions 44 inserted through the fastening holes 42 are threaded into the screw holes 24. As a result, the cover portion 40 is screwed to the casing portion 20.

In this embodiment, the cover portion 40 is configured to be attached onto the casing portion 20 even after the internal pressure of the casing portion 20 is increased to be equal to or higher than the above-described predetermined pressure and at least one of the lid portion 30 and the first connection portion 32 is fractured. That is, the strength of the cover portion 40 and connection strength of the second connection portion 44 are set such that the cover portion 40 remains to be attached onto the casing portion 20 even in the case where the rapid pressure increase occurs in the casing portion 20, the lid portion 30 or the first connection portion 32 is fractured, and thereafter the cover portion 40 is applied with the pressure from the inside of the casing portion 20 via the through holes 22 or an impact force from the lid portion 30 that is detached from the casing portion 20. The pressure, which is applied to the cover portion 40 from the inside of the casing portion 20 via the through holes 22 after the fracture of the lid portion 30 or the first connection portion 32, is preferably set as the above-described predetermined pressure, for example. The impact force, which is applied to the cover portion 40 from the lid portion 30 detached from the casing portion 20, is preferably set to a sufficiently large force in consideration of weight of the lid portion 30 and a distance between the lid portion 30 and the cover portion 40. The strength of the cover portion 40 can be adjusted by the material constituting the cover portion 40 and a thickness of the cover portion 40. Attachment strength of the second connection portion 44 can be adjusted by the materials of the casing portion 20 and the screw, overlap allowance of the screw, and the number of the screw.

A distance between the cover portion 40 and the outer surface of the casing portion 20 is preferably and appropriately set such that the fracture of the lid portion 30 or the first connection portion 32 is not prevented and that the lid portion 30 does not scatter in an undesirable direction when the rapid pressure increase occurs in the casing portion 20. In the case where the lid portion 30 is formed in a thin sheet shape and where the pressure in the casing portion 20 is released by the fracture of the lid portion 30, the cover portion 40 may contact the lid portion 30 without applying a pressure to the lid portion 30. That is, the distance between the cover portion 40 and the outer surface of the casing portion 20 is preferably set such that the lid portion 30 is not applied with the pressure from the cover portion 40 even in the case where the cover portion 40 and the lid portion 30 are located closest to each other and thus the cover portion 40 is in contact with the casing portion 20 due to accuracy at the time when the first connection portion 32 and the second connection portion 44 are formed. In the case where the lid portion 30 is not applied with the pressure from the cover portion 40, the lid portion 30 in the sheet shape can be fractured when the rapid pressure increase occurs in the casing portion 20.

A lower limit value of the distance between the cover portion 40 and the outer surface of the casing portion 20 is preferably set in such a manner as to allow detachment of the lid portion 30 from the casing portion 20 in the case where the first connection portion 32 is fractured to release the pressure from the casing portion 20 at the time when the rapid pressure increase occurs in the casing portion 20. FIG. 3 illustrates a situation where the cover portion 40 is separately arranged from the lid portion 30. In addition, in the case where the lid portion 30 is constructed of the member having the relatively low strength as in the case where the lid portion 30 is constructed of the resin sheet, an upper limit value of the distance between the cover portion 40 and the outer surface of the casing portion 20 is preferably set such that the distance between the cover portion 40 and the outer surface of the casing portion 20 is shorter than a width of a finger of a person. For example, the upper limit value of the above distance is preferably equal to or shorter than 10 mm and is more preferably equal to or shorter than 5 mm. In this way, it is possible to prevent the fracture of the lid portion 30 by mischief or an accident. Furthermore, in the case where a member (for example, high-voltage equipment with an operating voltage of DC 60 V or higher or AC 30V or higher, or the like) that is desirably protected against scattering of the lid portion 30 exists around an arranged position of the fuel cell 100, the upper limit value of the distance between the cover portion 40 and the outer surface of the casing portion 20 is preferably set in such a manner as to prevent scattering of the lid portion 30 toward the above member, which is desirably protected, from a clearance between the cover portion 40 and the casing portion 20 at the time of the fracture of the lid portion 30 or the first connection portion 32. That is, the cover portion 40 is preferably arranged near the outer surface of the casing portion 20 such that the above member, which is desirably protected, does not exist on a path of scattering of the lid portion 30 extended from the clearance between the cover portion 40 and the casing portion 20. In order to set the distance between the cover portion 40 and the outer surface of the casing portion 20 to a desired distance, for example, a convex portion that serves as a spacer for securing the desired distance may be provided on at least one of the outer surface of the casing portion 20 and a surface of the cover portion 40.

The second connection portions 44 in this embodiment are constructed of the two screws, and, as illustrated in FIG. 1 and FIG. 2, the cover portion 40 is screwed to the casing portion 20 at the two positions. However, the cover portion 40 may be screwed to the casing portion 20 at plural positions other than the two positions. Each of the second connection portions 44 only needs to secure the above-described connection strength and is not required to have the sealing property and the like. Thus, it is not necessary to arrange the screwing positions equally, and the number of the screwing positions can be minimized.

According to the fuel cell 100 including the fuel cell case 10 in this embodiment, which has been described so far, when the rapid pressure increase occurs in the casing portion 20, as in the case where hydrogen leaks out of the fuel cell stack 200 and is ignited in the casing portion 20, or the like, and at least one of the lid portion 30 and the first connection portion 32 is fractured in association with the rapid pressure increase, so as to release the pressure from the casing portion 20, it is possible to prevent the lid portion 30 from scattering in the unintended direction.

Figure 4:
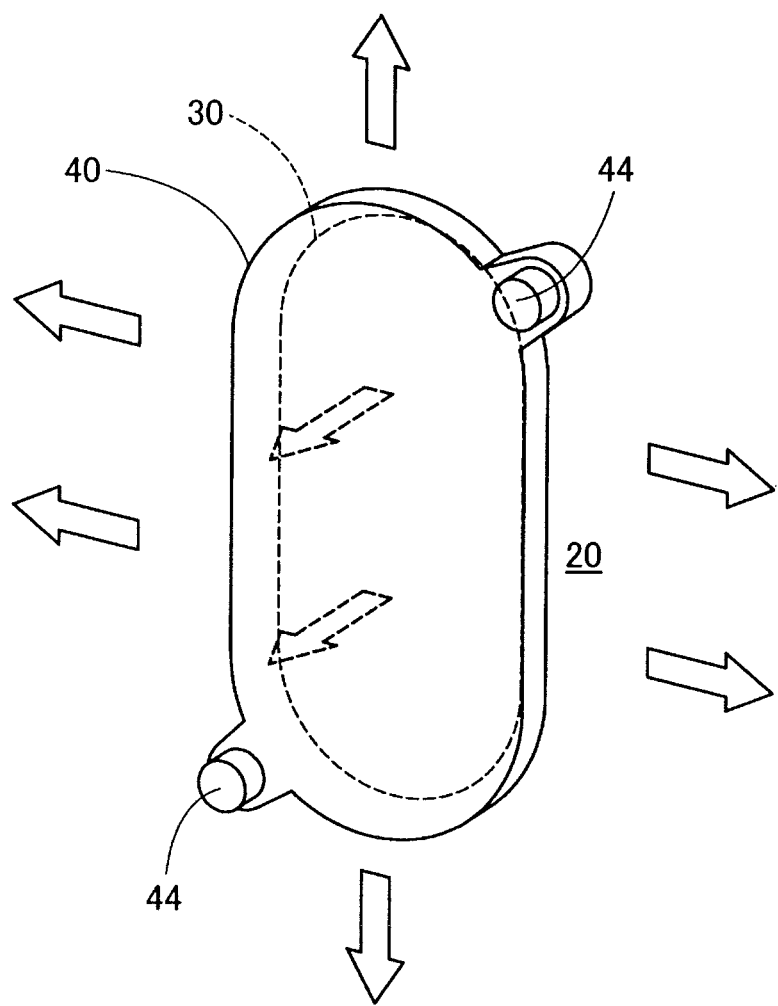
FIG. 4 is an explanatory view that schematically illustrates a direction in which a lid portion scatters at the time when a pressure is released from a casing portion.

FIG. 4 is an explanatory view that schematically illustrates a direction in which the lid portion 30 scatters at the time when the pressure is released from the casing portion 20. As illustrated in FIG. 4, the fractured lid portion 30 or the lid portion 30, which is detached from the casing portion 20 due to the fracture of the first connection portion 32, possibly scatters in any peripheral direction from the clearance between the cover portion 40 and the casing portion 20. In FIG. 4, such a situation is illustrated with arrows in up-down and left-right directions. In this embodiment, the cover portion 40 is provided to prevent the lid portion 30 from scattering in a perpendicular direction to the outer surface of the casing portion 20 (a direction indicated by broken arrows in FIG. 4). As a result, a part, equipment, or the like that is arranged in the direction indicated by the broken arrows, a user who performs maintenance and is positioned in such a direction, or the like can be protected against the lid portion 30. In the fuel cell 100, a hydrogen sensor may be provided in the casing portion 20, for example, so as to be able to prepare for and handle the leakage of hydrogen. However, even in the case where the preparation, such as provision of the hydrogen sensor, is made, just as described, there is a possibility that the leakage of hydrogen progresses to lead to the ignition due to failure of the sensor or the like. According to this embodiment, even in such a case, it is possible to suppress inconvenience caused by scattering of the lid portion 30 or pieces of the lid portion 30 in the unintended direction.

In this embodiment, in the case where the lid portion 30 is constructed of the resin sheet, the lid portion 30 is particularly fractured easily. Thus, when the rapid pressure increase occurs in the casing portion 20, the pressure can easily be released from the casing portion 20 by causing the fracture of the lid portion 30. In addition, in the case where the lid portion 30 is constructed of the resin sheet and where the lid portion 30 is scattered, it is possible to suppress a degree of damage to the peripheral part, equipment, and the like caused by the piece of the lid portion 30. Just as described, in the case where the lid portion 30 having the relatively low strength is used, the first connection portion 32 is formed of the adhesive layer. In this way, while the sealing property between the lid portion 30 and the casing portion 20 is sufficiently secured, the lid portion 30 can easily be connected to the casing portion 20 with the sufficient connection strength.

In this embodiment, as illustrated in FIG. 1 and FIG. 2, the single lid portion 30, which covers all of the plural through holes 22, is provided. However, the lid portion 30 may be provided for each of the through holes 22. In the case where the lid portion 30 is provided for each of the through holes 22, the cover portion 40 may be provided for each of the lid portions 30. However, when the lid portion 30 and the cover portion 40 that cover all of the plural through holes 22 are provided, the number of parts can be reduced, and thus attachment work of the lid portion 30 and the cover portion 40 can be simplified.

The cover portion 40 may not cover the entire lid portion 30, but may partially cover the lid portion 30. For example, the cover portion 40 may be formed in a shape that is one size smaller than the shape of the lid portion 30. In the case where the cover portion 40 is arranged over the lid portion 30, the same effect of suppressing scattering of the lid portion 30 or the pieces of the lid portion 30 can be obtained. However, in the case where the pressure is released by the fracture of the lid portion 30 during the pressure increase in the casing portion 20, it is possible to enhance the effect of suppressing scattering of the pieces of the lid portion 30 by enlarging the cover portion 40.

Note that, when the lid portion 30 is fractured by the pressure increase in the casing portion 20, not only the case where a part of the fractured lid portion 30 is scattered to the outside of the casing portion 20 but also the case where the part of the fractured lid portion 30 is scattered to the inside of the casing portion 20 are considered. Accordingly, in the case where the member (for example, the above-described high-voltage equipment or the like) that is desirably protected against scattering of the lid portion 30 exists in the casing portion 20, the through hole 22 is desirably provided at a position through which the scattered lid portion 30 is unlikely to reach the above member, the protection of which is desired. For example, the through hole 22 is preferably provided in a surface that is the farthest from the above member, the protection of which is desired, among the outer surfaces of the casing portion 20.

In addition, instead of specially providing the through hole 22 in the casing portion 20 for the above-described purpose of releasing the pressure, an existing hole provided in the casing portion 20 may be used as the through hole 22. For example, when the fuel cell stack 200 is accommodated in the casing portion 20, a hole, through which a fastening rod passes, is provided in the casing portion 20, and the above accommodating operation is performed while the fuel cell stack 200 is pressed in the stacking direction by using the fastening rod. In such a case, the above hole can be used as the through hole 22.

B. Second Embodiment

Figure 5:
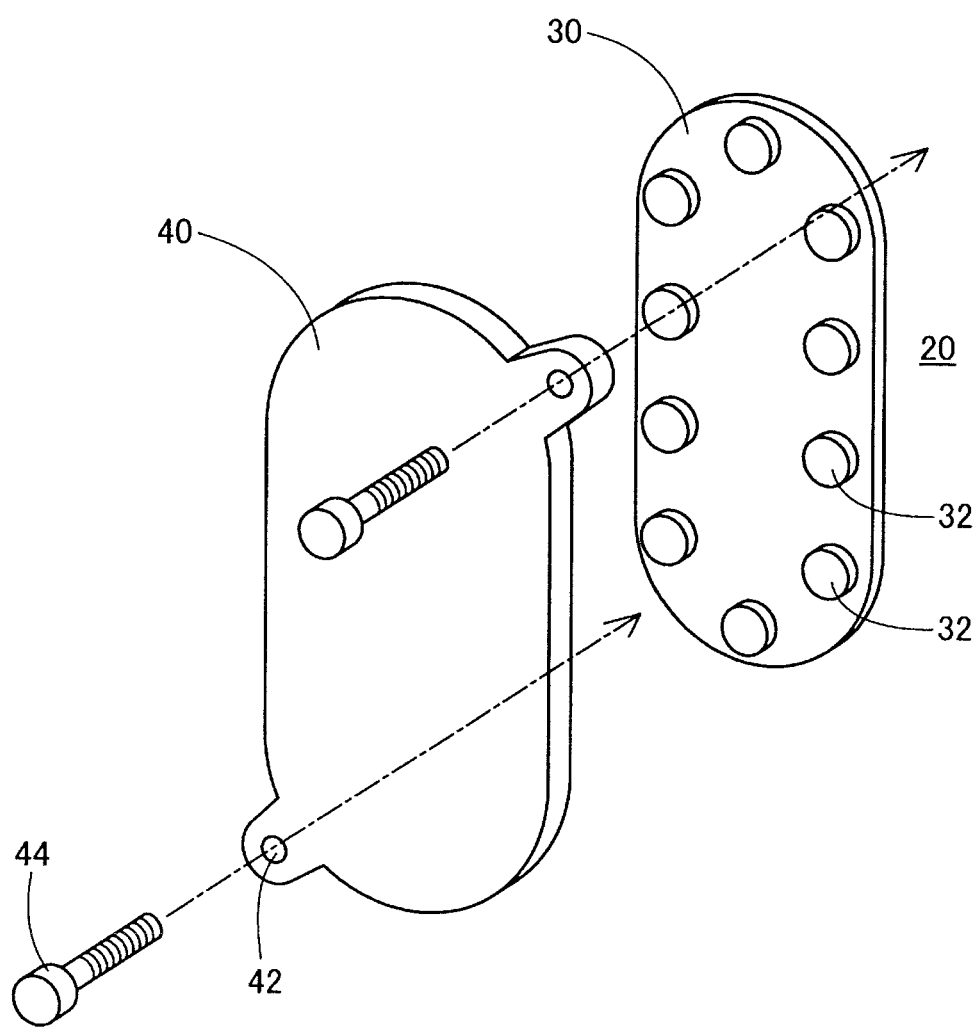
FIG. 5 is a perspective view that schematically illustrates a situation where the lid portion and a cover portion are attached to the casing portion.

FIG. 5 is a perspective view that schematically illustrates a situation where the lid portion 30 is attached to the casing portion 20 and the cover portion 40 is further attached thereto in a fuel cell case 10 according to a second embodiment. In the second embodiment, the fuel cell case 10 has the same configuration as that in the first embodiment except for the first connection portion 32. Thus, the common portions will be denoted by the same reference numerals.

In the second embodiment, the first connection portion 32 is constructed of plural screws. That is, the lid portion 30 is attached to the outer surface of the casing portion 20 by the plural screws as the first connection portion 32. In order to secure the sealing property between the lid portion 30 and the casing portion 20, in this embodiment, the plural screws are provided at substantially equally-spaced intervals. In addition, in order to secure the sealing property between the lid portion 30 and the casing portion 20, a gasket that is formed in a shape to surround the through hole 22 may be provided at a position between the lid portion 30 and the outer surface of the casing portion 20.

Also, with such a configuration, in the case where the cover portion 40 remains to be attached onto the casing portion 20 even after the internal pressure of the casing portion 20 is increased to be equal to or higher than the above-described predetermined pressure and at least one of the lid portion 30 and the first connection portion 32 is fractured, the same effects as those in the first embodiment can be obtained. In this embodiment, the connection strength of the first connection portion 32 can be set according to a material of each of the screws constituting the first connection portion 32, the material of the casing portion 20, overlap allowance of each of the screws, and the number of the screws.

C. Third Embodiment

Figure 6:
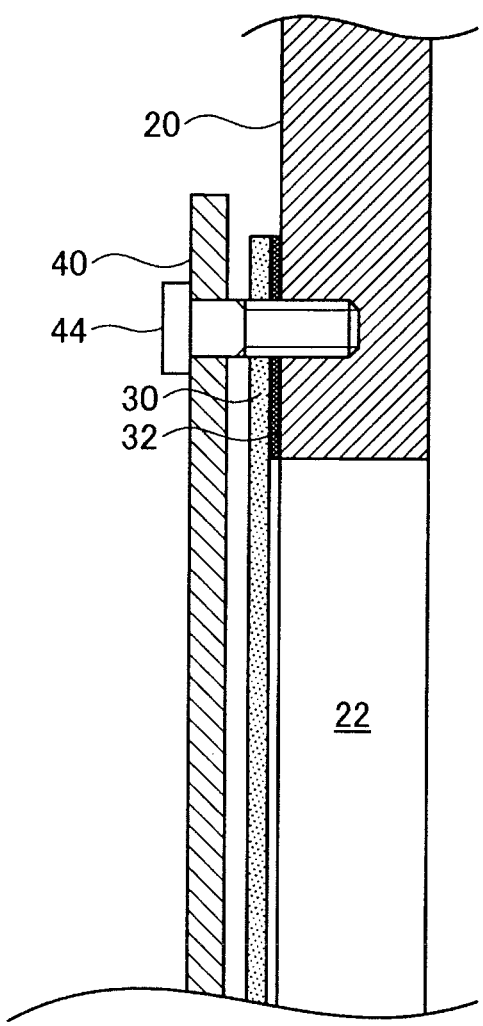
FIG. 6 is a cross-sectional view of a situation where the lid portion and the cover portion are attached to the casing portion.

FIG. 6 is a cross-sectional view that schematically illustrates a situation where the lid portion 30 and the cover portion 40 are attached to the casing portion 20 in a fuel cell case 10 according to a third embodiment. In the third embodiment, the fuel cell case 10 has the same configuration as that in the first embodiment except for arrangement of the first connection portion 32 and the second connection portion 44. Thus, the common portions will be denoted by the same reference numerals.

In the third embodiment, a screw constituting the second connection portion 44 is fastened to the casing portion 20 at a position where the screw overlaps the adhesive layer constituting the first connection portion 32. As in the first embodiment and the second embodiment, in the case where the first connection portion 32 and the second connection portion 44 are different components, it is easy to set the connection strength of each of the connection portion to the desired strength. As a result, it is possible to easily achieve such a configuration that, for example, when the rapid pressure increase occurs in the casing portion 20, the first connection portion 32 fractured, but the second connection portion 44 connects the cover portion 40 and the casing portion 20. However, as in the third embodiment, the connection strength of each of the first connection portion 32 and the second connection portion 44 is appropriately set. Accordingly, even in the case where the first connection portion 32 and the second connection portion 44 partially overlap each other, it can be configured that, even after the internal pressure of the casing portion 20 is increased and the first connection portion 32 is fractured, the second connection portion 44 connects the cover portion 40 and the casing portion 20. In this way, the same effects as those in the first embodiment and the second embodiment can be obtained.

Alternatively, the first connection portion 32 and the second connection portion 44 may include a common screw. Then, by using the common screw, the lid portion 30 may be attached to the casing portion 20, and the cover portion 40 may be attached to the casing portion 20. In such a case, as in the second embodiment illustrated in FIG. 5, the sufficient number of the screws is preferably used to secure the sealing property between the lid portion 30 and the casing portion 20. Then, the lid portion 30 is preferably a member having such strength that the lid portion 30 is fractured when the rapid pressure increase occurs in the casing portion 20 but the first connection portion 32 and the second connection portion 44 are not fractured. At this time, in order not to hinder the fracture of the lid portion 30, for example, a surface on the inner side (a side opposing the lid portion 30) of the cover portion 40 may be a concave shape, so as to further secure a sufficient distance between the surface of the cover portion 40 and the lid portion 30.

D. Fourth Embodiment

Figure 7:
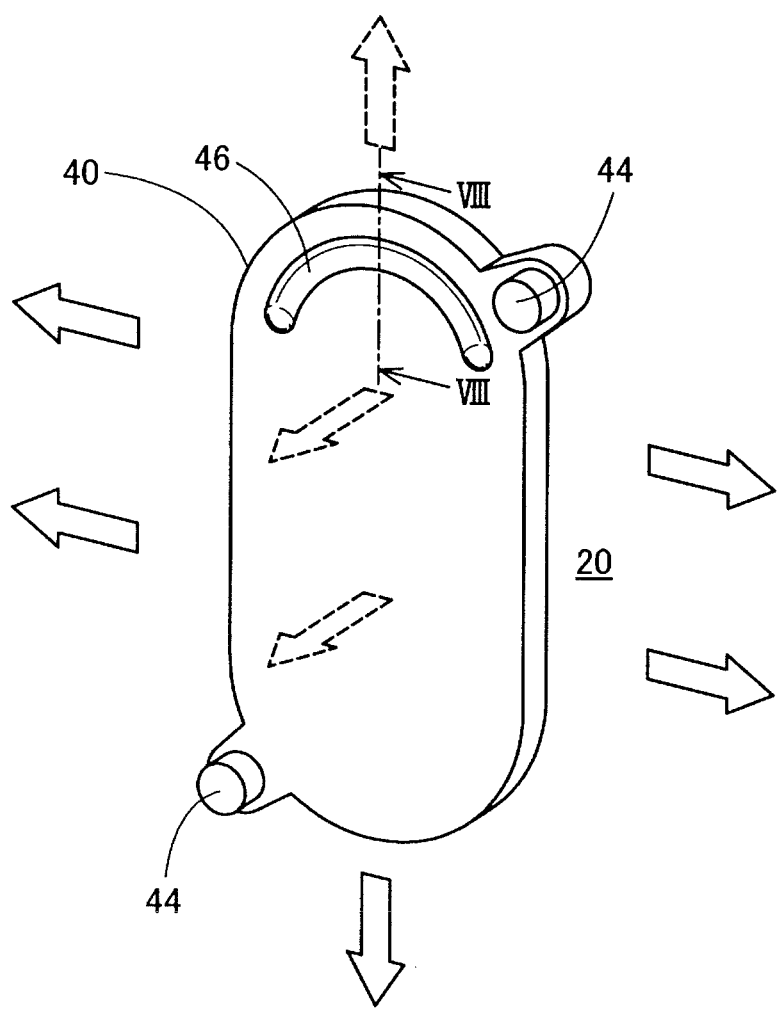
FIG. 7 is another perspective view that schematically illustrates the situation where the lid portion and the cover portion are attached to the casing portion.
Figure 8:
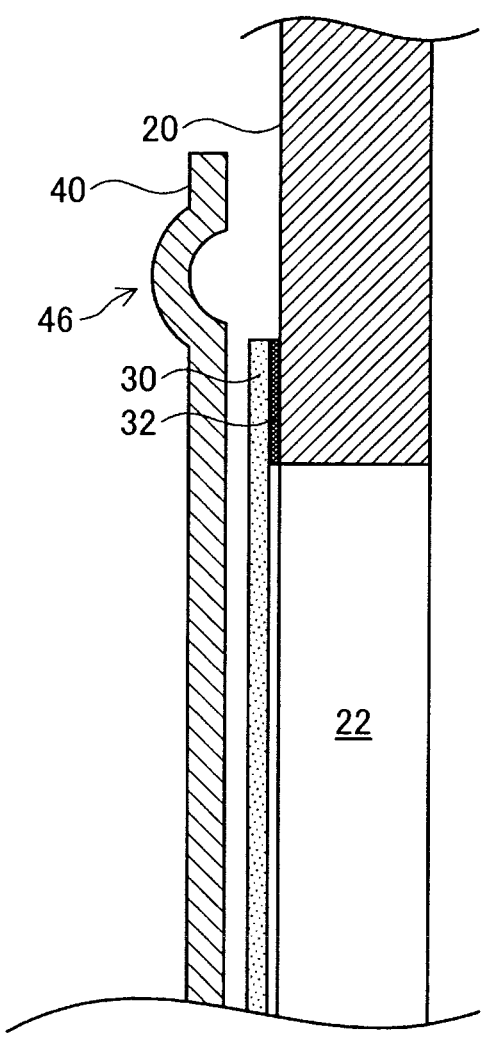
FIG. 8 is another cross-sectional view that schematically illustrates the situation where the lid portion and the cover portion are attached to the casing portion.

FIG. 7 is a perspective view that schematically illustrates a situation where the lid portion 30 and the cover portion 40 are attached to the casing portion 20 in a fuel cell case 10 according to a fourth embodiment in a similar manner to FIG. 5. FIG. 8 is a cross-sectional view that schematically illustrates a situation of cross section VIII-VIII in FIG. 7. In the fourth embodiment, the fuel cell case 10 has the same configuration as that in the first embodiment except for the cover portion 40. Thus, the common portions will be denoted by the same reference numerals.

In the fourth embodiment, the cover portion 40 has a bead 46 as a high-rigid portion that has higher rigidity than the rest of the cover portion 40. The bead 46 is provided along an outer circumference of the cover portion 40 at a position near an outer circumference on an upper end side of the cover portion 40, and is a groove-shaped structure that is projected in a reverse direction from the casing portion 20. For example, the bead 46 can be formed by pressing. By providing the bead 46 having such a projected structure, it is possible to improve the rigidity and the strength of the cover portion 40 by increasing a section modulus and geometrical moment of inertia. In the case where such a cover portion 40 is used, a portion of the cover portion 40 near the bead 46 is unlikely to be deformed at the time when the rapid pressure increase occurs in the casing portion 20 and the lid portion 30 or the piece of the lid portion 30 hits the cover portion 40. Accordingly, the lid portion 30 or the piece of the lid portion 30 is likely to be scattered around from the position where the bead 46 is not provided and thus a deformation amount is large. In the case where the member (for example, the above-described high-voltage equipment or the like) that is desirably protected against scattering of the lid portion 30 exists near the position, at which the through hole 22 is provided, in the casing portion 20 of the fuel cell case 10, the bead 46 is provided on the side where the above member, the protection of which is desired, is arranged. In this way, it is possible to enhance the effect of protecting the above member, the protection of which is desired. In FIG. 7, the situation where the lid portion 30 or the piece of the lid portion 30 is unlikely to be scattered from the side of the cover portion 40, where the bead 46 is provided, is illustrated by using a broken upward arrow.

Figure 9:
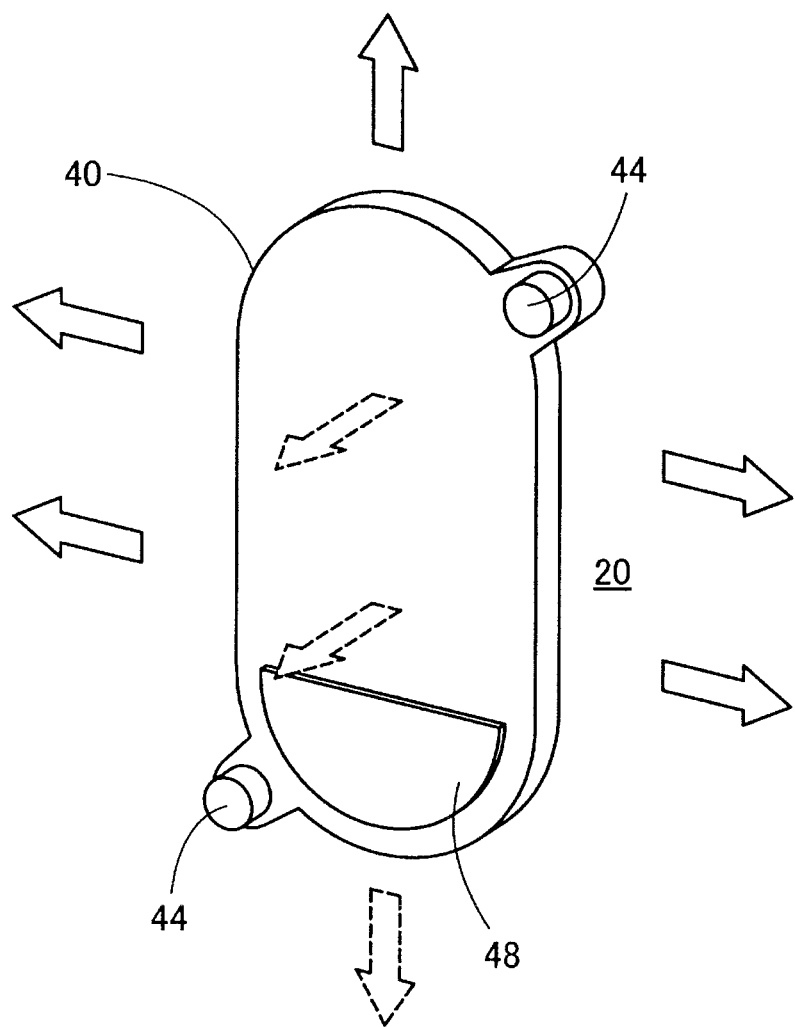
FIG. 9 is yet another perspective view that schematically illustrates the situation where the lid portion and the cover portion are attached to the casing portion.

FIG. 9 is a perspective view that illustrates a situation where the lid portion 30 and the cover portion 40 are attached to the casing portion 20 in a fuel cell case 10 according to a modified example of the fourth embodiment in the similar manner to FIG. 5. In the modified example illustrated in FIG. 9, the fuel cell case 10 has the same configuration as that in the first embodiment except for the cover portion 40. Thus, the common portions will be denoted by the same reference numerals. The cover portion 40 in the modified example illustrated in FIG. 9 has, as the high-rigid portion having the higher rigidity than the rest of the cover portion 40, a thickened portion 48 in which a thin plate in a half-moon shape is adhered to the surface of the cover portion 40. The shape of the thickened portion 48 may be a shape other than the half-moon shape. The rigidity of the cover portion 40 is increased in the portion provided with the thickened portion 48. Thus, when the rapid pressure increase occurs in the casing portion 20, and the lid portion 30 or the piece of the lid portion 30 hits the cover portion 40, the portion of the cover portion 40 near the thickened portion 48 is less likely to be deformed. Accordingly, the lid portion 30 or the piece of the lid portion 30 is likely to be scattered around from the position where the thickened portion 48 is not provided and thus the deformation amount is large. Therefore, the same effects as those in the fourth embodiment illustrated in FIG. 7 can be obtained. In FIG. 9, the situation where the lid portion 30 or the piece of the lid portion 30 is unlikely to be scattered from the side of the cover portion 40, where the thickened portion 48 is provided, is illustrated by using a broken downward arrow.

The description has been made on the configuration that the high-rigid portion having the higher rigidity than the rest of the portion is actively provided in the cover portion 40 with reference to FIG. 7 to FIG. 9. However, a portion having the lower rigidity than the rest of the portion may actively be provided. As a result, the rest of the portion may serve as the high-rigid portion. A method for providing the lower-rigid portion than the rest of the portion includes a method of producing a scar in a particular region of the cover portion 40 by pressing, for example.

In the above description, the rigidity of the plate-shaped portion in the cover portion 40 is locally changed, so as to locally change likeliness of the modification of the cover portion 40 at the time when the lid portion 30 or the piece of the lid portion 30 hits the cover portion 40. However, a different configuration may be adopted. For example, in the case where the second connection portion 44, which attaches the cover portion 40 to the casing portion 20, is constructed of the plural screws, which are arranged along the outer circumference of the cover portion 40, at positions near the outer circumference of the cover portion 40, the likeliness of the modification of the cover portion 40 may locally be changed according to a state of density of the screws. The modification of the cover portion 40 can be suppressed more in the portion where the screws are densely arranged than in the portion where the screws are scarcely arranged.

E. Other Embodiments

In each of the above embodiments, the first connection portion 32, which attaches the lid portion 30 to the casing portion 20, includes the adhesive layer or the screw, but may have a different configuration. Instead of providing the first connection portion 32 as the separate component from the lid portion 30 and the casing portion 20 like the adhesive layer and the screw, the first connection portion 32 may integrally be provided with at least one of the lid portion 30 and the casing portion 20. For example, in the case where the lid portion 30 is the metal member, the lid portion 30 and the casing portion 20 may be connected by welding or brazing, and the first connection portion 32 may integrally be formed with the lid portion 30 and the casing portion 20. Alternatively, an engaged portion or a disengaged portion may be provided on each of the surface of the lid portion 30 and the surface of the casing portion 20. Then, the engaged portion and the disengaged portion may be engaged with each other to connect the lid portion 30 and the casing portion 20. In this way, the first connection portion 32 may be constructed of a part of the lid portion 30 and a part of the casing portion 20.

In each of the above embodiments, the second connection portion 44, which attaches the cover portion 40 to the casing portion 20, includes the screw, but may have a different configuration. For example, a convex portion that serves as a spacer for keeping the distance between the cover portion 40 and the casing portion 20 may be provided on the surface of the casing portion 20 or the surface of the cover portion 40. Then, in the case where the connection strength can be secured, the cover portion 40 and the casing portion 20 may be connected in the convex portion by using the adhesive, and the second connection portion 44 may be constructed of the adhesive layer. Instead of providing the second connection portion 44 as the separate component from the cover portion 40 and the casing portion 20 like the screw or the adhesive layer, the second connection portion 44 may integrally be provided with at least one of the cover portion 40 and the casing portion 20. For example, the convex portion that serves as the spacer for keeping the distance between the cover portion 40 and the casing portion 20 may be provided on the surface of the casing portion 20 or the surface of the cover portion 40. Then, the cover portion 40 and the casing portion 20 may be connected in the convex portion by welding or brazing. In this way, the second connection portion 44 may integrally be formed with the cover portion 40 and the casing portion 20. Alternatively, the engaged portion or the disengaged portion may be provided on each of the surface of the cover portion 40 and the surface of the casing portion 20. Then, the engaged portion and the disengaged portion may be engaged with each other to connect the cover portion 40 and the casing portion 20. In this way, the second connection portion 44 may be constructed of the part of the cover portion 40 and the part of the casing portion 20.

In either of the cases, in the case where it is configured that, when the rapid pressure increase occurs in the casing portion 20, at least one of the lid portion 30 and the first connection portion 32 is fractured to release the pressure from the casing portion 20 and that the cover portion 40 remains to be attached to the casing portion 20 even with the lid portion 30 or the piece of the lid portion 30 hitting the cover portion 40, the same effects as those in each of the above-described embodiments can be obtained.

The disclosure is not limited to the above-described embodiments and can be implemented by having any of various configurations within the scope that does not depart from the gist thereof. For example, technical features in the embodiments that correspond to technical features in the aspects described in SUMMARY can appropriately be replaced or combined to solve a part or the whole of the above-described problem or to achieve some or all of the above-described effects. In addition, when any of those technical features is not described as being essential in the present specification, such technical feature(s) can appropriately be eliminated.

What is claimed is:
1. A fuel cell case comprising:
a casing in which a space for accommodating a fuel cell stack is formed, the casing having a through hole that communicates between the space and outside of the casing;
a lid that is attached to an outer surface of the casing by a first connection and is configured to close the through hole; and
a cover that is arranged on the lid and is attached to the outer surface of the casing, wherein
at least one of the lid and the first connection is configured to be fractured when an internal pressure of the casing is increased to be equal to or higher than a predetermined pressure, the cover is configured to be attached to the casing even after the internal pressure of the casing is increased to be equal to or higher than the predetermined pressure, and at least one of the lid and the first connection is fractured, the cover includes a high-rigid portion, the high-rigid portion of the cover has higher rigidity than a portion of the cover other than the high-rigid portion of the cover, and the high-rigid portion of the cover is provided on a surface of the cover facing away from the lid.

2. The fuel cell case according to claim 1, wherein the cover is attached to the casing by a second connection that differs from the first connection.

3. The fuel cell case according to claim 1, wherein the lid is a resin sheet, and
the first connection is an adhesive layer.

4. A fuel cell case comprising:
a casing in which a space for accommodating a fuel cell stack is formed, the casing having a through hole that communicates between the space and outside of the casing;
a lid that is attached to an outer surface of the casing by a first connection and is configured to close the through hole; and
a cover that is arranged on the lid and is attached to the outer surface of the casing, wherein at least one of the lid and the first connection is configured to be fractured when an internal pressure of the casing is increased to be equal to or higher than a predetermined pressure, the cover is configured to be attached to the casing even after the internal pressure of the casing is increased to be equal to or higher than the predetermined pressure, and at least one of the lid and the first connection is fractured, the cover is arranged separately from the lid, and a distance between the cover portion and the outer surface of the casing is equal to or shorter than 5 mm.

5. The fuel cell case according to claim 1, wherein the high-rigid portion of the cover is defined by a bead extending along an outer circumferential portion of the cover at one end of the cover, the bead being defined by a groove-shaped structure projecting into the cover in a direction away from the casing.

6. The fuel cell case according to claim 1, wherein the high-rigid portion of the cover is a thickened portion of the cover formed by a plate adhered to a surface of the cover.

* * * * *